United States Patent [19]

Mailliet et al.

[11] Patent Number: 4,497,379

[45] Date of Patent: Feb. 5, 1985

[54] MODULAR PIVOTAL FLUIDIC JOINT SYSTEMS AND COMPONENTS THEREOF

[75] Inventors: Pierre Mailliet; Edgar Kraemer, both of Howald, Luxembourg

[73] Assignee: Paul Wurth S.A., Luxembourg

[21] Appl. No.: 313,780

[22] Filed: Oct. 22, 1981

[30] Foreign Application Priority Data

Nov. 17, 1980 [LU] Luxembourg .......................... 82942

[51] Int. Cl.³ ................................................ F17D 1/00
[52] U.S. Cl. ...................................... 173/39; 137/799; 137/615; 266/271
[58] Field of Search ..................... 173/39; 137/798, 799, 137/615; 266/271

[56] References Cited

U.S. PATENT DOCUMENTS

| 3,504,705 | 4/1970 | Wight et al. ........................ 137/615 |
| 3,698,433 | 10/1972 | Dobler et al. ....................... 137/615 |
| 4,097,033 | 6/1978 | Mailliet .............................. 266/271 |
| 4,186,763 | 2/1980 | Ferguson et al. ................. 137/615 X |
| 4,195,825 | 4/1980 | Ulveling et al. .................... 266/271 |
| 4,201,373 | 5/1980 | Ulveling et al. .................... 266/271 |

Primary Examiner—Frank T. Yost
Attorney, Agent, or Firm—Fishman & Dionne

[57] ABSTRACT

Multi-path rotatable fluid couplings are formed from modular elements so as to have one, two or three axes about which relative rotation of supply and discharge conduits may occur. These modular elements may be employed in an articulated delivery system for multiple fluids wherein, for example, six pivot axes are provided through a combination of two or more couplings with interconnecting rigid conduits.

31 Claims, 12 Drawing Figures

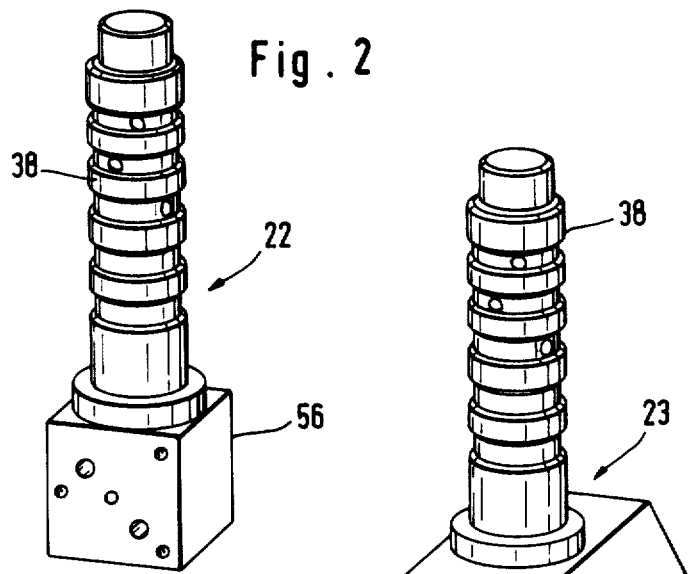
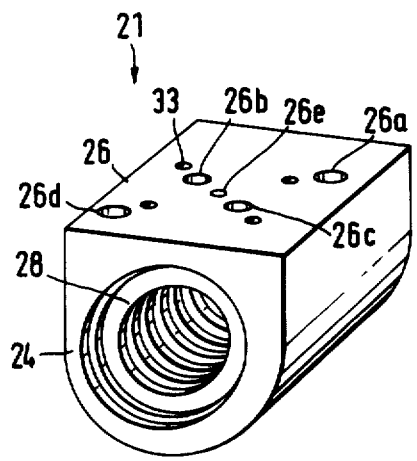
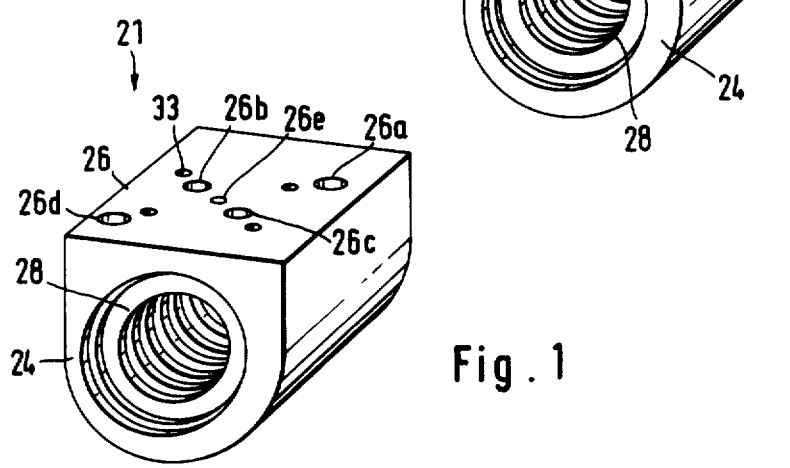

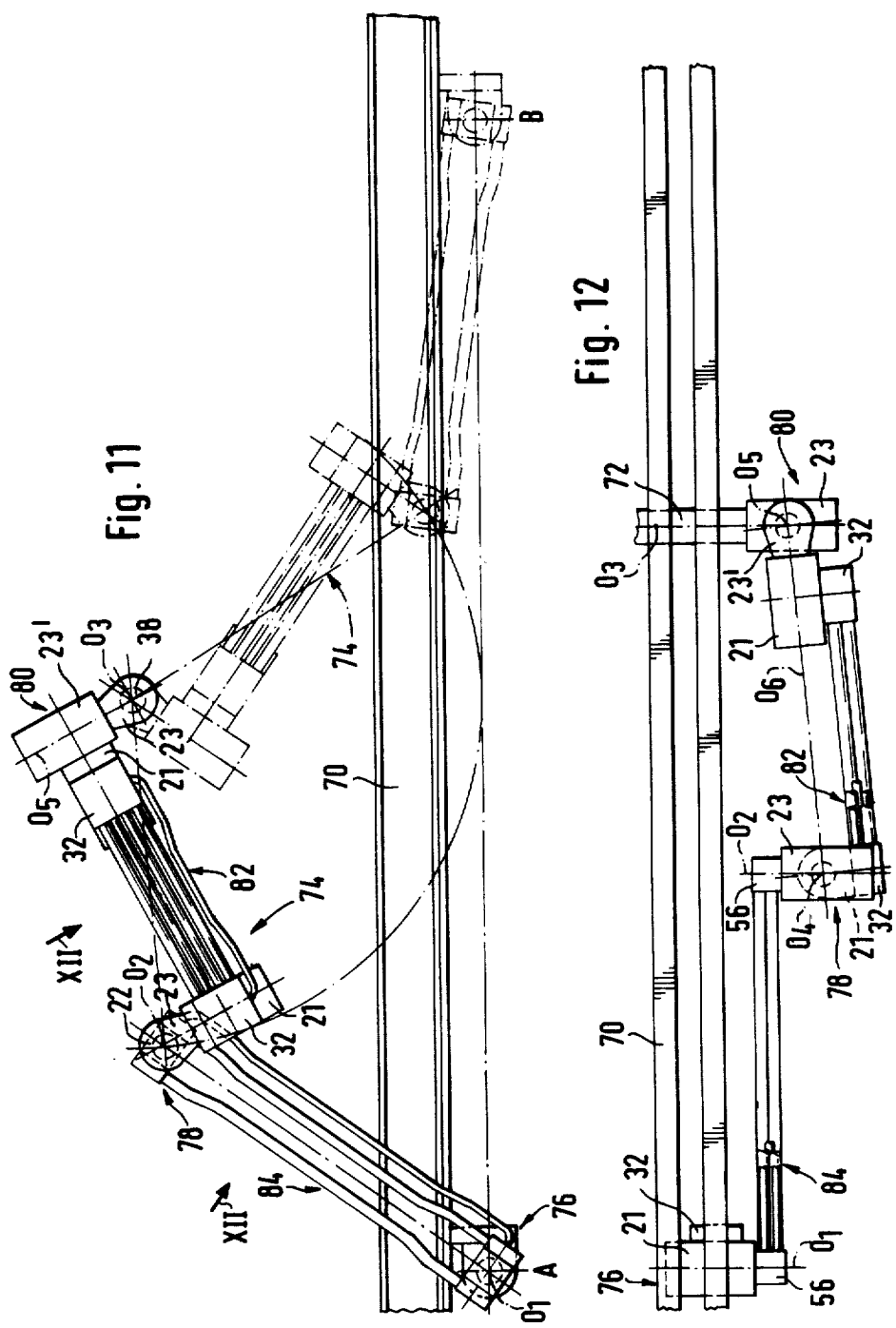

MODULAR PIVOTAL FLUIDIC JOINT SYSTEMS AND COMPONENTS THEREOF

BACKGROUND OF THE INVENTION (1) Field of the Invention

The present invention relates to the establishment of multi-path fluid tight pivotal connections and particularly to the delivery of hydraulic fluid under pressure to a movable tool. More specifically, the present invention is directed to pivotal fluid couplings which are assembled from modular elements and especially to combinations of such couplings which define an articulated multiple path fluid transmission system. Accordingly, the general objects of the present invention are to provide novel and improved methods and apparatus of such character.

(2) Description of the Prior Art

While not limited thereto in its utility, the present invention is particularly well suited for employment in a harsh operating environment, such as in proximity to a blast furnace, for the delivery of pressurized hydraulic fluid to a tool such as a tap hole drill. Accordingly, the discussion below will emphasize the operational problems incident to feeding a drill for the tap holes of blast furnaces with hydraulic and/or pneumatic fluid. Such tap hole drilling devices are disclosed and described in U.S. Pat. Nos. 4,097,033, 4,195,825, and 4,201,373. In the case of a tap hole drill the tool is designed to slide along a support bar and the operating fluid for the tool is available at a supply station which is fixed in position relative to the support bar. A plurality of fluid-tight connections must be established between the supply station and the tool which, as may be seen from the above-referenced patents, must be capable of undergoing complex motion.

The drills generally used for opening the tap holes of a shaft furnace, particularly a blast furnace, are percussion devices which, in the prior art, have almost exclusively been pneumatically actuated. The use of pneumatic tools has been dictated by difficulties, which will be discussed below, in reliably delivering hydraulic fluid to the movable drill. A percussion drill requires at least two feed circuits, one for producing rotation of the tool and the other for causing reciprocation of the bit thereof. If the drill is capable of performing supplementary actions, for example, rotation in two opposite directions and/or delivering is percussive output in two directions, the number of required fluidic feed circuits will be correspondingly increased. Furthermore, tap hole drills are customarily equipped with a blower which serves for the removal of cuttings produced during operation while simultaneously cooling the drill bit and its crown. The blower requires a separate compressed air feed conduit. Thus, it may be seen that a multi-path fluid delivery system with articulated couplings is required between the above-mentioned fixed predetermined supply station, where the pneumatic or hydraulic fluid is available, and the drill itself. The delivery system must accomodate movement of the drill along the support bar over a distance of several meters.

The delivery system which has found the most widespread usage in the prior art comprises simply the employment of flexible hoses between the operating fluid source (supply station) and the tool. This approach to solving the problem of delivering the operating fluid to a movable tap hole drill has numerous disadvantages. Firstly, a complicated and expensive tensioning and winding apparatus is required and the various suspended hoses and cables in the vicinity of the drill pose a safety hazard to the operator. Additionally, the hoses hang over the tap spout during the drilling operation and are thus liable to be damaged by molten metal splashed thereon when the tap hole is opened. In the case of a hydraulic feed, this presents the additional safety hazard of the possibility of fire resulting from the leakage of the hydraulic fluid.

One approach to solving the above-discussed problems incident to the use of flexible hoses is disclosed in above-mentioned U.S. Pat. No. 4,097,033. This approach contemplates the use of rigid conduits interconnected by means of rotary couplings to provide for the feed of the operating fluid to the drill. In order for the feed system of U.S. Pat. No. 4,097,033 to function correctly, however, the rotation axes of the rotary couplings must remain precisely parallel at all times. Any deviation from such parallelism will cause binding, whereupon the drill cannot be moved, and/or will cause rapid deterioration of the couplings with the resultant leakage of operating fluid. Because of manufacturing tolerances, it is exceedingly difficult, if not impossible, to achieve and maintain the requisite parallelism, particularly in the harsh operating condition of a blast furnace where thermally induced deformation of components will occur.

The above-discussed problems may be overcome with comparative ease in those cases where the drill is exclusively a pneumatic device. Thus, by way of example, in the case of a pneumatic drill the compressed air may be supplied to the drill via a suitable main conduit, constructed in the manner disclosed in U.S. Pat. No. 4,097,033, and the stream of compressed air may be subdivided within the drill itself, by means of remotely controlled valves, into as many separate streams as there are functions to be performed. This, of course, requires the inclusion in the drill of valves, which are themselves operated by compressed air, and auxiliary conduits must be provided for valve control purposes. These control fluid supply conduits, however, are of very small cross section and are more or less flexible and thus do not present the above-discussed problems. Furthermore, since all of the pressures employed in a pneumatic system are moderate, and most importantly because it is not necessary to provide for return of the operating pneumatic fluid to the source, any problems encountered may be easily solved through the use of compressible seals and other known means. Thus, in an entirely pneumatic system, it is necessary to employ only a single main conduit and, in part since the pneumatic pressures never exceed 5-8 bar, it is possible to overcome the problems of maintaining parallelism between the articulation axes by providing a rotating and oscillating coupling and a pair of Cardan-type connections with bellows-type compensators. Under these circumstances, even if some minor leakage were to occur, it would not have any serious detrimental effect.

The above-briefly discussed techniques for delivering pneumatic operating fluid to a tap hole drill are, unfortunately, not applicable to hydraulic systems. Whereas a pneumatic drill will typically operate with a pressure in the range of 5-8 bar, as discussed above, the pressure of the hydraulic fluid employed for operating a tap hole drill will typically be in the range of 100 to 200 bar. Further, a single main feed conduit is inadequate in a hydraulic system since the hydraulic fluid must be returned to a resevoir rather than merely being exhausted to the ambient atmosphere at the drill. If a reliable hydraulic supply could be established for a tap hole drill, however, significant operating advantages would be realized. By way of example, a hydraulic tool produces substantially less noise during operation when compared to a similar pneumatic tool. Also, the quantities of compressed gas required to operate a pneumatic drill are comparatively large while the hydraulic drill, partly because of its higher operating pressure, consumes considerably less fluid and requires much less energy for operation. In fact, the energy consumption of a hydraulic motor is about 50% below that of a comparable pneumatic motor. It is additionally to be noted that a tap hole drill will be operated in tandem with a clay gun which is employed to plug the tap hole. Since the clay gun is hydraulically operated, a source of pressurized hydraulic fluid is available. It would thus be advantageous to employ the hydraulic supply of the clay gun for operating the drill. Unfortunately, there has not previously been a reliable manner for simultaneously establishing a plurality of flow paths for hydraulic fluid from a stationary source to a load, such as a tap hole drill, which undergoes complex movements.

SUMMARY OF THE INVENTION

The present invention overcomes the above-briefly discussed and other deficiencies and disadvantages of the prior art by providing for the simultaneous establishment of a plurality of flow paths between a stationary point and a moving device. The present invention also encompasses apparatus, comprising a plurality of modular elements which, when combined, provide articulated connections between plural rigid conduits to establish a hydraulic delivery system which is capable of reliably undergoing complex movements without leakage.

Apparatus in accordance with the present invention thus comprises modular elements which cooperate to establish multiple path fluid-tight pivotal connections. These connections are characterized by an articulated structure comprising at least one pair of basic (modular) elements which are relatively rotatable. At least one of these elements may comprise a body which is provided with a cylindrical bore having a series of alternating lands and grooves. The grooves in the wall of the cylindrical bore communicate with passages, extending transversely with respect to the axis of the bore, to the exterior of the body. A second element of each pivotal connection may comprise a cylindrical body, provided with lands and grooves on its surface, which is received in the bore of the first element so that the grooves of the two elements are in registration. The second element will be provided with a series of internal passages, communicating with the grooves therein, which will extend to another exterior surface. Means, in the form of suitable packings or seals, will be provided between the abutting lands on the two elements to prevent leakage between adjacent grooves. Relative rotation between the two elements will not disrupt the multiple fluid flow paths which comprise the registered grooves on the two elements. The diameter of the passages in the elements and the dimensions of the grooves may be selected as a function of the rate of hydraulic fluid flow to be established.

A first coupling element in accordance with the present invention is provided with the aforementioned bore, having the alternating lands and grooves, and the "transverse" passages which establish communication with the grooves terminate at a common flat external face on the body of the element. The ends of these passages will preferably be symmetrically arranged about the center of the flat face whereby the coupling element may be employed in multiple positions. The flat face is also tapped, at a plurality of symmetrically arranged locations, to permit the attachment of a connection block to the element whereby plural rigid conduits may be placed in communication with the passages and grooves in the element.

In accordance with the present invention a second modular coupling element comprises a cylindrical portion, which cooperates with the bore in the above-described first element in the manner discussed above, and a head portion at one end of the cylindrical portion. This head portion has at least a first flat face and flow passages within the cylindrical body portion will be terminated at this flat face with the termination apertures preferably being symmetrically arranged.

A third coupling element in accordance with the present invention may consist essentially of a combination of the above-briefly described first and second elements. That is, the cylindrical body portion of the second element may be affixed to the flat surface of the first element with the internal flow passages of the cylindrical portion being in registration with the terminations of the flow passages at the flat face of the first element. Accordingly, fluid communication will be established between the internal grooves of the bore in the body portion and the external grooves of the cylindrical portion mounted on the flat face of the body portion.

The three above-described basic modular elements may be interconnected in any desired manner to provide an articulated hydraulic joint with as many pivot axes as necessary or desired.

In accordance with a preferred embodiment of the invention, an articulated hydraulic coupling further comprises a pair of identical, and thus interchangeable, bearings positioned between a pair of modular elements to facilitate the relative motion therebetween. These interchangeable bearings also assist in the retention of the relative positioning between the elements which define a rotatable coupling. Additionally, articulated hydraulic couplings in accordance with the present invention employ interchangeable detachable covers and closing rings which prevent leakage and maintain the desired spacial relationship between the modular elements.

The pivotal hydraulic couplings of the present invention may be combined with sets of rigid conduits to define a fluid transmission system for coupling a fixed pivot to a moving pivot. Such a transmission system may also include a further pivot joint intermediate the fixed and moving pivots, the number of pivot axes thus being greater than the number of pivots in the system.

In the environment of a tap hole drill for a shaft furnace, the elements of the present invention may be combined with rigid conduits to define a system for simultaneously feeding both hydraulic and pneumatic fluid to the drill which is movable along a support bar, the hydraulic and pneumatic fluid being available at a single predetermined region or station which is fixed in relation to the bar. Thus, in one reduction to practice, a fluid transmission system is provided at one end with a pivot, through which a plurality of separate fluid paths are established, having a single pivot axis. The transmission system is also provided, at its opposite end, with a coupling device which permits movement about three mutually orthogonal pivot axes. The transmission system is further provided, intermediate its ends, with still another hydraulic joint which permits movement of the interconnecting rigid conduits about two mutually perpendicular axes.

Continuing to discuss the above-mentioned reduction to practice in association with a tap hole drill, the coupling at the first end of the system is defined by a combination of the above-described first and second modular elements, the coupling at the second end of the system is defined by a combination of an element of the first type and two elements of the third type and the intermediate joint is formed by a combination of all three modular elements.

BRIEF DESCRIPTION OF THE DRAWINGS

The present invention may be better understood and its numerous objects and advantages will become apparent to those skilled in the art by reference to the accompanying drawing wherein like reference numerals refer to like elements in the several FIGURES and in which:

FIG. 1 is a perspective view of a modular element for a pivotal hydraulic joint in accordance with the present invention;

FIG. 2 is a perspective view of a second modular element for a pivotal hydraulic joint in accordance with the present invention;

FIG. 3 is a perspective view of a third modular element for a pivotal hydraulic joint in accordance with the present invention;

FIG. 11 is a side elevation view of a fluid transmission system in accordance with the present invention which is particularly well suited for the delivery of hydraulic and pneumatic fluid from fixed position sources to a moving tool; and FIG. 12 is a plan view of the system of FIG. 11.

DESCRIPTION OF THE PREFERRED EMBODIMENTS

Figures 4, 5:
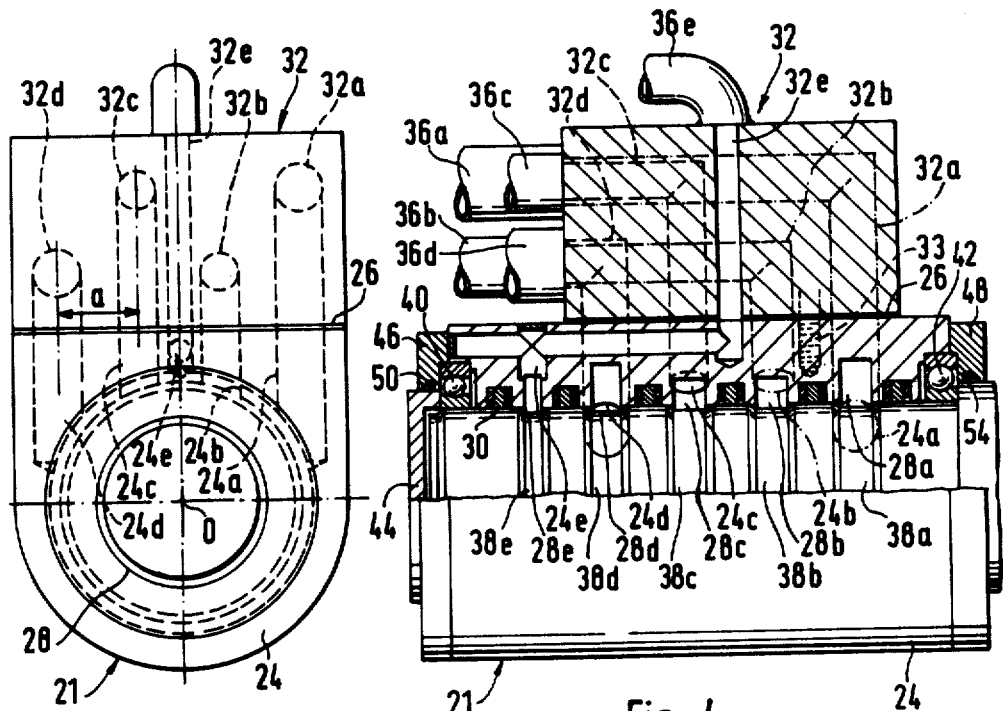
FIG. 4 is a schematic side elevation view, partly in section, of an articulated hydraulic joint employing the element of FIG. 1.
FIG. 5 is a schematic view of the apparatus of FIG. 4 with cover removed.

With reference now to the drawing, FIG. 1 depicts a first interchangeable element or module 21 which comprises a body or block 24 having at least a first planar surface 26. The block 24 is also provided with a cylindrical bore 28, the axis of bore 28 being parallel to the plane defined by surface 26.

The details of module 21 may best be seen by simultaneous consideration of FIGS. 1, 4 and 5. Thus, the cylindrical bore 28 is provided, in its surface, with alternating annular lands and grooves, the grooves being indicated at 28a, 28b, 28c, 28d and 28e. As may be seen from FIG. 4, these grooves may differ in cross-sectional area as a function of the rate of flow of fluid which will pass therethrough. In the example depicted in the drawing, the module 21 will be employed in a hydraulic fluid feed system for a percussive type tap hole drill and thus there will be two comparatively deep grooves 28a and 28d which form part of the hydraulic feed circuit for the percussive device, while a pair of smaller grooves 28b and 28c in part define the hydraulic circuit for operating the actual drilling instrument. The fifth groove 28e, of still smaller cross sectional area, forms part of the feed circuit for compressed air which is employed to cool the drill and blow cuttings away from the vacinity of the drill bit.

Continuing to refer to FIG. 4, each of the lands which define therebetween a groove is provided with a sealing ring or packing 30, the number of packings thus being greater than the number of annular grooves. The packings 30 may, for example, consist of sealing rings marketed under the trade name ROTOMATIC, Type M17 or M19 by Martin Merkel KG, of Hamburg, Germany. The packings 30 prevent the leakage of fluid between adjacent grooves with hydraulic pressures of up to 400 bar by cooperating, in the manner to be described below, with annular lands on a cooperating module which is received in the bore 28 of module 21.

The planar surface 26 of module 21 is provided with a plurality of apertures 26a, 26b, 26c, 26d and 26e which constitute the termination of passages formed within the block 24. These passages, indicated at 24a, 24b, 24c, 24d and 24e in FIGS. 4 and 5, provide fluid communication between the grooves in the wall of the bore 28 and respective of the apertures in surface 26. The cross sectional area of these passages 24a-24e are, like the dimensions of the groove with which they communicate, a function of the fluid flow rate to be established in an associated circuit.

The surface 26 of block 24 is also provided with a plurality of tapped holes 33 which provide means for affixing a connector block, such as the block indicated generally at 32 in FIG. 4, to module 21. The connector block 32 is provided with internal passages 32a, 32b, 32c, 32d and 32e which terminate, at first ends, at points which may be placed in registration with the apertures in the surface 26 of block 24 whereby fluid communication between the grooves in the bore 28 in block 24 and the passages in connector block 32 may be established. The opposite ends of the passages in connector block 32 are connected, in any suitable manner, to respective of rigid conduits 36a, 36b, 36c, 36d and 36e. The connector block 32 will, of course, be provided with holes which receive the fasteners which engage the tapped holes 33 in surface 26 of block 24 whereby the connector block may be tightly secured to the module 21. If necessary, sealing rings may be provided about the junctions of the passages in blocks 24 and 32.

Figure 6:
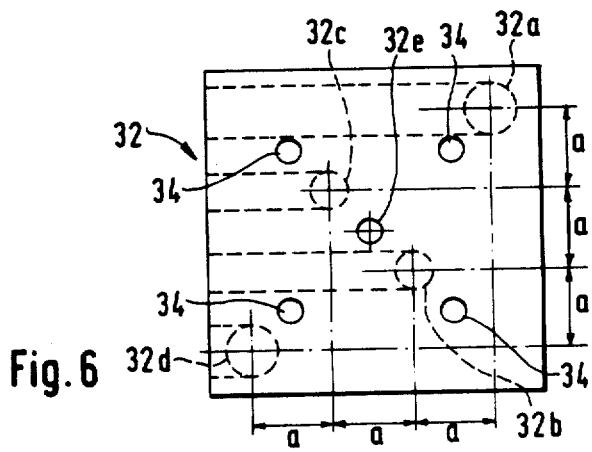
FIG. 6 is a schematic diagram of a connector block, also shown in FIG. 4, which may be employed with the element of FIG. 1.

Referring to FIG. 6, it may be seen that the arrangement of the apertures in surface 26 of block 24 and the first ends of the passages in connector block 32 are symmetrical with respect to the centers of the cooperating surfaces on the module and connector block. Similarly, the spacing between two adjacent passages, in the direction transverse to the axes of the passages, is always equal to a constant distance "a" which corresponds to the spacing between the annular grooves in the bore 28 of block 24. This symmetrical arrangement of passage terminations enables the connector block 32 to be installed either with the orientation shown in FIG. 4 or with an opposite orientation. It is further possible, by doubling the number of passages formed in block 24, i.e., by providing two passages which communicate with each of the annular grooves in bore 28, to construct a module wherein the connector block may additionally be rotated by 90° with respect to the orientation of FIG. 4.

In order to form an articulated fluid connection utilizing the module 21 of FIG. 1, it is necessary to employ a second element, such as shown in either of FIGS. 2 or 3, which includes a "journal" which will extend into the bore 28 of block 24. In FIGS. 2 and 3 such a "journal" has been indicated at 38. This journal 38 is of cylindrical shape and is also provided with alternating annular lands and grooves on its surface. When inserted in the bore 28, the lands of journal 38 cooperate with the packings 30 to define a plurality of rotatable seals. Thus, relative rotation between block 24 and journal 38 about the axis 0, see FIG. 5, of bore 28 of block 24 is possible without leakage of pressurized fluid between adjacent grooves because of the cooperation between the packings 30 and the lands of the journal. As will be described in greater detail below, the journal 38 is traversed by internal passages which provide fluid communication between the spaced grooves and a second region of the modular element which includes the journal, there being typically one such internal passage for each groove in the journal and the spacing between the grooves of the journal being commensurate with that between the cooperating grooves in the wall of bore 28 of module 21. Referring to FIG. 4, the grooves of a journal 38 inserted in bore 28 of module 21 are indicated at 38a, 38b, 38c, 38d and 38e.

The relative rotation of the block 24 relative to a journal 38 is facilitated by the employment of a pair of bearings, indicated at 40 and 42 in FIG. 4, at the opposite ends of block 24. The bearings 40 and 42 are positioned outwardly with respect to the outermost of the packings 30. Bearings 40 and 42 are interchangeable and may also be employed in various devices fabricated from the modules of FIGS. 1, 2 and 3 such as are shown in, for example, FIGS. 7 and 10. Continuing to refer to FIG. 4, and presuming that the journal 38 extends into block 24 from the right as the device is shown, the opposite end of bore 28 will be capped by means of a cover 44 which is affixed to the end of the journal 38 by screws, not shown. Finally, the articulated fluid joint is completed by a pair of closing rings 46 and 48 which are also interchangeable. A fluid tight joint between closing ring 46 and cover 44 is established through the use of a sealing ring 50 while a fluid tight joint is achieved between the closing ring 48 and the body of the journal 38 by means of a sealing ring 54 at the point where the "journal" extends outwardly from the block 24. The closing rings, bearings and cover 44 cooperate with one another and with the module 21 and the journal 38 to retain the components of the articulated fluid joint together.

Figures 7, 8:
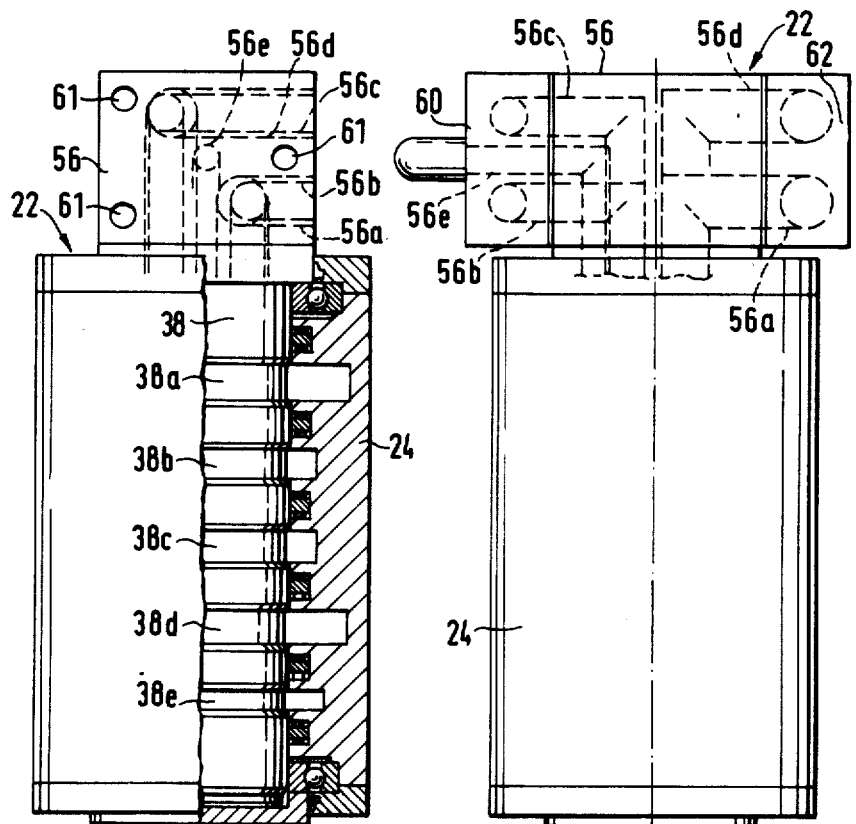
FIG. 7 is a schematic view, partly in section, of an articulated hydraulic joint employing the element of FIG. 2.
FIG. 8 is a schematic side elevation view, partly in section, of the apparatus of FIG. 7.
Figure 9:
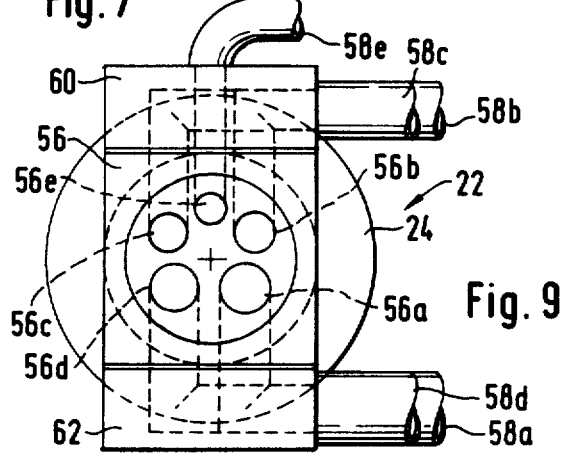
FIG. 9 is a front schematic view of the apparatus of FIG. 7.

Referring now to FIG. 2, the modular element indicated therein generally at 22 comprises a journal 38, of the type described above, and an integral distribution block or head 56. Referring to FIGS. 7, 8 and 9, which depict schematically an articulated fluidic joint which includes the module 22, the details of element 22 may be seen. For purposes of explanation, it will be presumed that FIGS. 7, 8 and 9 show an articulated joint defined by the elements 21 of FIG. 1 and 22 of FIG. 2. Thus, FIGS. 7, 8 and 9 show generally the same articulated fluidic joint as illustrated in FIGS. 4-6. In discussing FIGS. 7-9, accordingly, the module 21 will not again be described in detail.

The module 22 is traversed by internal passages 56a, 56b, 56c, 56d and 56e which establish fluid communication between a planar surface on the distribution head 56 and respective of the grooves 38a, 38b, 38c, 38d and 38e in the surface of the journal 38. The distribution head 56 is preferably of cubicle shape and the terminations of the internal channels in the module 22 will typically be divided between a pair of opposed flat surfaces of the distribution head. Referring to FIG. 9, a pair of connection blocks 60 and 62 are designed for affixation to the opposed faces of the distribution block where the internal passages are terminated. In the same manner as with the connection block 32 described above in the discussion of FIG. 4, the connection blocks 60 and 62 are provided with flow passages which mate with the terminations of the flow passages in the distribution head and which provide communication between these module flow passage terminations and respective of rigid external conduits 58a, 58b, 58c, 58d and 58e. The connection blocks 60 and 62 are provided with through holes and the faces of the distribution head 56 are provided with tapped holes 61 whereby the connection blocks may be bolted to the distribution head.

Considering simultaneously the structure depicted in FIGS. 4-9, the modules 21 and 22 and the connection blocks 32, 60 and 62 provide a means of establishing fluid communication between individual of rigid conduits 36a, 36b, 36c, 36d and 36e and respective of rigid conduits 58a, 58b, 58c, 58d and 58e. The integrity of this multi-path rotatable fluid connection is not disturbed by relative rotation, about axis 0 of the bore in module 21, of one group of rigid conduits relative to the other.

It is to be noted that a particular desirable feature of the present invention resides in the fact that the internal passages in the modules 21 and 22 are always comprised of straight segments. Accordingly, these internal flow passages may be fabricated by a simple drilling operation performed on cast or machined blocks.

It is also to be noted that, if necessary or desirable, the grooves of the journal 38 and those formed in the wall of the bore 28 of block 24 may be reversed. That is, rather than employ comparatively shallow grooves having the same cross-sectional area between the lands of the journal, the grooves between the lands on the journal may be deeper and of variable depth, as determined by the desired flow rate, while the grooves in the bore 28 of block 24 may be comparatively shallow and all of the same depth.

Considering now FIG. 3, a third modular element for use in the formation of an articulated hydraulic joint in accordance with the present invention is indicated generally at 23. The element 23 comprises a combination of the modules 21 and 22 in that it employs the block 24 of module 21 and the journal 38 of the module 22. In module 23 the journal 38 is oriented perpendicularly with respect to the axis of the bore 28 of block 24. Each of the grooves in the surface of the journal 38 communicates, via an internal passage in the journal and a cooperating passage in block 24, with an internal groove in the wall of bore 28 of block 24. The module 23 may be employed in cooperation with one or more of the modules 21 and 22 as well as with other identical modules 23.

Figure 10:
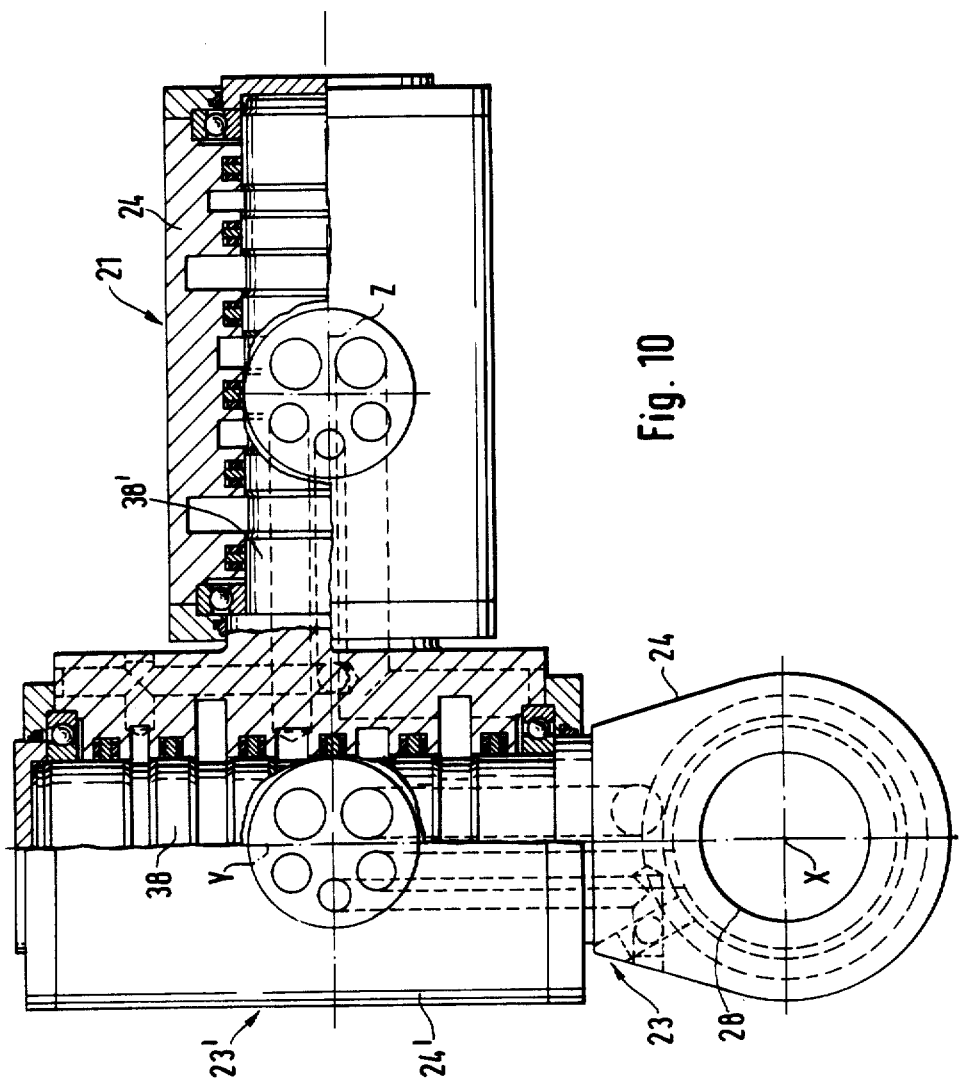
FIG. 10 is a side elevation view, partly in section, of a hydraulic joint in accordance with the present invention which has three pivot axes.

FIG. 10 depicts a pivotal multi-path fluidic coupling produced through the use of a pair of identical modules 23 and 23' with a module 21. Thus, the journal 38 of the module 23 is received in the block 24' of the module 23' while the journal 38' of module 23' is received in the block 24 of the module 21. The arrangement of FIG. 10 enables the establishment of fluid communication between a plurality of rigid conduits which are, in the manner described above in the discussion of FIG. 4, attached to a connector block 32 affixed to the module 21, and a distributing or receiving journal, not shown, which is received in the bore 28 of block 24 of the module 23. The system of FIG. 10 thus constitutes a universal joint since there are three pivot axes. That is, the block 24 of module 23 may pivot about axis X, the block 24 of module 23' may pivot about axis Y and the modules 23 and 23' may pivot relative to module 21 about axis Z; the axes X, Y and Z being transverse to one another. It is particularly noteworthy that all of the elements illustrated in FIG. 10, this is also true of FIGS. 1-9, are interchangeable and occupy only a moderate amount of space. In particular, the supplementary elements such as the bearings 40 and 42, the cover 44 and the closing rings 46 and 48 as shown in FIG. 4 are identical to the corresponding elements shown in FIG. 10 and can be used with either of the three modules shown in FIGS. 1-3.

FIGS. 11 and 12 schematically illustrate an operating fluid transmission system suitable for delivering pressurized hydraulic and pneumatic fluids to a shaft furnace tap hole drill. In considering the drawing, it is to be understood that FIG. 12 is a plan view taken in the direction indicated by arrows XII—XII of FIG. 11. In FIGS. 11 and 12 a support bar, along which the drill will move, has been indicated at 70. In the interest of facilitating understanding of the drawing, the percussion drill has been omitted from the drawing. It will be understood, however, that the drill is designed to travel between a retracted position A and an operating position B. The drill would be connected to a pivotal coupling 76. The supply station for the pressurized hydraulic and pneumatic fluids is at a fixed point 72. An articulated fluid delivery system, which has been indicated generally at 74, provides communication between the stationary sources of operating fluid, i.e., the point 72, and the drill. This delivery system 74 may be caused to assume either of the two extreme positions, respectively shown by continuous lines and broken lines, as well as any position intermediate these two extreme positions.

In theory the provision of three pivot axes indicated at $O_1$, $O_2$ and $O_3$ would suffice to enable the system 74 to occupy all of the above-discussed positions. However, any lack of parallelism between these three axes, however slight, will subject the multi-path fluid couplings to excessive strain and will result in an overloading of the conduits and bearings thus leading to destruction of the fluid joints and leakage. By employing the modular hydraulic joint establishment concept of the present invention, the system 74 may adapt itself to compensate for any manufacturing inaccuracies and to accommodate any subsequent deformations which result from, for example, thermally induced distortion. This result is obtained as a result of the provision of three supplementary pivot axes. The present invention thus substantially eliminates all of the stresses which would otherwise occur in the rotating fluid couplings and thus considerably reduces the risk of destruction and leakage and prolongs the service life of fluid delivery system.

Continuing to describe the apparatus depicted in FIGS. 11 and 12, as noted the articulated system 74 is connected to the drill by means of a coupling 76 which permits a simple pivoting motion of the drill about axis $O_1$. The pivotal coupling 76 will correspond to the compound articulated joint formed by using the modules 21 and 22 as illustrated in FIGS. 4–9. Thus, a first set of rigid conduits, indicated generally at 84 and comprising four hydraulic conduits and one pneumatic conduit, will extend from the distribution head 56 of a module 22. The journal 38 of this module will rotate, about axis $O_1$, in the block of a module 21 which is provided with a connector block 32 through which the hydraulic and pneumatic operating fluids are delivered to the drill.

A first joint, indicated at 78, of the articulated system 74 is defined by a combination of modules 21, 23 and 22. Thus, a second set of rigid conduits 82 is coupled to the connector block 32 of a module 21 of joint 78. This module 21 is associated with a module 23. The module 23, in turn, is associated with a module 22. This module 22 of joint 78 is connected to the conduits of set 84 via its distribution head 56 in the manner depicted in FIG. 9. Thus, in addition to the pivoting movement about axis $O_2$, the multi-path hydraulic coupling 78 also enables a pivoting movement to take place about an axis $O_4$ which corresponds to the longitudinal axis of the journal 38 of the module 23 and thus of the axis of the bore of module 21 of joint 78.

The articulated system 74 further comprises a fluidic coupling, indicated generally at 80, wherein pivotal motion about three orthogonal axes is permitted. The joint 80 will be of the type illustrated in FIG. 10. The admission of the hydraulic and pneumatic fluid from the stationary supply circuits is effected via a fixed pivot 72 which is constructed in the form of a journal 38. A first module 23 engages this fixed journal 38 and a second module 23' engages the journal of the module 23. The journal of the second module 23', in turn, is received in the bore of a module 21 which is connected to the conduits of set 82 via its connector block 32. The joint 80 therefore enables pivoting movement about the axis $O_3$ to be supplemented by pivoting movement about the orthogonal axes $O_5$ and $O_6$.

It should be noted that the two sets of rigid conduits 82 and 84 are preferably not in the form of straight pipes. Rather, the conduits are formed with two areas having opposite curvature, as shown in the case of the conduits of set 84, whereby the conduits may undergo some degree of thermal expansion without any disadvantageous affect on the connection thereof to the connector blocks 32 and the distribution heads 56.

To summarize the above discussion, a device for delivering hydraulic and pneumatic fluid to a drill, as depicted in FIGS. 11 and 12, includes six pivot axes which, in the direction in which the fluid circulates, include three axes at joint 80, two axes at joint 78 and one axis at joint 76, i.e., a combination 3-2-1. It is to be noted that, employing the modular technique and elements of the present invention, various other combinations of the pivot axes can be adopted provided that, in the example illustrated, the total number of pivot axes is six and there are not more than three such axes combined together. In addition to the aforementioned combination 3-2-1, it is possible to adopt the following combinations as viewed in the direction in which the fluid circulates:

2-3-1
2-1-3
1-2-3
3-1-2
1-3-2
2-2-2.

It is preferred, however, for the fluid transmission system to have a single pivot axis at the drill since this is the point in the articulated system which is subjected to the harshest operating conditions in terms of vibration and heat.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A multi-path rotatable fluid coupling to which fluidic pressure lines are secured comprising:
    first joint means, said first joint means including a body portion having a cylindrical bore, said first joint means having a plurality of spacially separated annular grooves formed in the wall of said bore, said first joint means further having a plurality of internal passages, said passages establishing fluid communication between said annular grooves and the exterior of said first joint means, said first joint means further having a cylindrical extendion, said extension having a plurality of annular grooves formed on the exterior thereof, said extension having an axis which is oriented transversely with respect to the axis of said bore;
    second joint means, said second joint means having a body portion and a cylindrical extension, said extension being sized to be rotatably fitted within said bore of said first joint means, said second joint means being provided with internal pssages extending between the exterior of said body portion and the exterior of said extension, the terminations of the passages at the exterior of said extension, the terminations of the passages at the exterior of said extension being in registration with said annular grooves of said first joint means;
    first sealing means, said first sealing means fluidically sealing said second joint means within said bore of said first joint means while allowing rotation between said first joint means, said sealing means preventing leakage of fluid between adjacent of said first joint means grooves;
    third joint means, said third joint means having a cylindrical bore provided with annular grooves, said extension of said first joint means being rotatable fitted within the bore of said third joint means, said third joint means having internal passages which establish fluid communications between the exterior of said third joint means and said grooves in said bore of said third joint means; and
    second sealing means fluidically sealing said extension of said first joint means within said bore of said third joint means, said second sealing means preventing leakage of fluid between adjacent grooves of the bore of said third joint means while permitting relative rotation between said first and third joint means.

2. The coupling of claim 1 wherein said first joint means extension is provided with a plurality of annular grooves about its periphery, said grooves being in registration with said grooves in said bore of said third joint means, each of said internal passages of said third joint means thereby being placed in communication with a respective passage in said second joint means.

3. The coupling of claim 2 wherein said body of said second joint means is provided with at least one external flat surface at which said internal passages terminate.

4. The coupling of claim 3 further comprising:
    first coupling means for connecting conduits of a first plurality to respective of said passages at said flat surface of said second joint means.

5. The coupling of claim 4 wherein said third joint means is provided with an external flat surface at which said internal passages terminate.

6. The coupling of claim 5 further comprising:
    second coupling means for connecting conduits of a second plurality to respective of said passages at said flat surface of said third joint means whereby fluid communication is established between individual conduits of said first and second pluralities through said joint means.

7. A multi-path rotatable fluid coupling to which fluidic pressure lines are secured comprising:
    first joint means, said first joint means including a body portion having a cylindrical bore, said first joint means having a plurality of spacially separated annular grooves formed in the wall of said bore, said first joint means further having a plurality of internal passges, said passages establishing fluid communication between said annular grooves and the exterior of said first joint means, said first joint means further having a cylindrical extension, said extension having a plurality of annular grooves formed on the exterior thereof, said extension having an axis which is oriented transversely with respect to the axis of said bore;
    second joint means, said second joint means having a body portion and a cylindrical extension, said extension being sized to be rotatably fitted within said bore of said first joint means, said second joint means being provided with internal passages extending between the exterior of said body portion and the exterior of said extension, the terminations of the passages at the exterior of said extension being in registration with said annular grooves of said first joint means; and
    sealing means, said sealing means fluidically sealing said second joint means within said bore of said first joint means while allowing rotation between said joint means, said sealing means preventing leakage of fluid between adjacent of said first joint means grooves.

8. A multi-path rotatable fluid coupling to which fluidic pressure lines are secured comprising:
    first joint means, said first joint means including a body portion having a cylindrical bore, said first joint means having a plurality of specially separated annular grooves formed in the wall of said bore, said first joint means further having a plurality of internal passages, said passages establishing fluid communication between said annular grooves and the exterior of said first joint means;
    second joint means, said second joint means having a body portion and a cylindrical extension, said extension being sized to be rotatably fitted within said bore of said first joint means, said second joint means being provided with internal passages extending between the exterior of said body portion and the exterior of said extension, the terminations of the passages at the exterior of said extension being in registration with said annular grooves of said first joint means, said body portion of said second joint means being of cubical shape and some of said internal passages terminating at a first face of said body portion and other of said passages terminating at a second face of said cubical body; and 9. The coupling of claim 1, 7 or 8 wherein said second joint means extension is provided with a plurality of annular grooves about its periphery, said grooves being in registration with said grooves of said first joint means, each of said internal passages being placed in communication with respective of said grooves.

10. The coupling of claim 9 wherein said grooves of said second joint means extension are of equal volumn.

11. The coupling of claim 9 wherein said grooves of said second joint means extension are of unequal volumn.

12. The coupling of claim 9 wherein said body portion of said second joint means is provided with at least one external flat surface at which said internal passages terminate.

13. The coupling of claim 12 further comprising:
first coupling means attached to said second joint means, said first coupling means connecting conduits of a first plurality to respective of said internal passages at said flat surface of said second joint means body portion.

14. The coupling of claim 13 wherein said first joint means is provided with an external flat surface at which said internal passage terminate.

15. The coupling of claim 14 further comprising:
second coupling means for connecting conduits of a second plurality of respective of said internal passages at said flat surface of said first joint means whereby fluid communication is established between individual conduits of said first and second pluralities through said joint means.

16. The coupling of claim 15 wherein said sealing means comprises:
sealing rings coaxial with said second joint means extension, one of said sealing rings being located to each side of each of said grooves in said first joint means bore, said sealing rings contacting said first and second joint means and permitting relative rotation therebetween.

17. The coupling of claim 16 wherein said passage terminations are symmetrically arranged about the center of said flat surface.

18. The coupling of claim 13 wherein said sealing means comprises:
sealing rings coaxial with said second joint means extension, one of said sealing rings being located to each side of each of said grooves in said first joint means bore, said sealing rings contacting said first and second joint means and permitting relative rotation therebetween.

19. The coupling of claim 9 wherein the spacing between each of the grooves of said first and second joint means is identical and wherein the volumn of the registered grooves of the first and second joint means is selected as a function of the flow rate of the fluid to be passed therethrough.

20. The coupling of claim 1, 7 or 8 wherein said first joint means is provided with an external flat surface at which said internal passages terminate.

21. The coupling of claim 20 further comprising:
means coupling conduits to respective of said passages at said flat surface of said first joint means.

22. The coupling of claim 21 wherein said sealing means comprises:
sealing rings coaxial with said second joint means extension, one of said sealing rings being located to each side of each of said grooves in said first joint means bore, said sealing rings contacting said first and second joint means and permitting relative rotation therebetween.

23. The coupling of claim 20 wherein said passage terminations are symmetrically arranged about the center of said flat surface.

24. The coupling of claim 1, 7 or 8 wherein said sealing means comprises:
sealing rings coaxial with said second joint means extension, one of said sealing rings being located to each side of each of said grooves in said first joint means bore, said sealing rings contacting said first and second joint means and permitting relative rotation therebetween.

25. The coupling of claim 1, 7 or 8 further comprising:
bearing means positioned between said first and second joint means, said bearing means comprising a pair of interchangeable bearings.

26. The coupling of claim 25 further comprising: a pair of identical closing rings, said closing rings retaining said bearing in place; and
means sealing said closing rings to said first joint means.

27. A multi-path rotatable fluid coupling to which fluidic pressure lines are secured comprising:
first joint means, said first joint means including a body portion having a cylindrical bore, said first joint means having a plurality of spacially separated annular grooves formed in the wall of said bore, said first joint means further having a plurality of internal passages, said passages establishing fluid communication between said annular grooves and the exterior of said first joint means, said first joint means is provided with an external flat surface at which said internal passages terminate, said passage terminations being symmetrically arranged about the center of said flat surface;
second joint means, said second joint means having a body portion and a cylindrical extension, said extension being sized to be rotatably fitted within said bore of said first joint means, said extension being provided with a plurality of annular grooves about its periphery, said grooves being in registration with said grooves of said first joint means, each of said internal passages being placed in communication with respective of said grooves, said second joint means being provided with internal passages extending between the exterior of said body portion and the exterior of said extension, the terminations of the passages at the exterior of said extension being in registration with said annular grooves of said first joint means, said body portion of said second joint means being provided with at least one external flat surface at which said internal passages terminate, said passage terminations being symmetrically arranged about the center of said flat surface;

said second joint means being of cubical shape and some of said internal passages terminating at a first face of said body portion and other of said passages terminating at a second face of said cubical body portion;

sealing means, said sealing means fluidically sealing said second joint means within said bore of said first joint means while allowing rotation between said joint means, said sealing means preventing leakage of fluid between adjacent of said first joint means grooves;

and sealing rings being coaxial with said second joint means extension, one of said sealing rings being located to each side of each of said grooves in said first joint means bore, said sealing rings contacting said first and second joint means and permitting relative rotation therebetween;

first coupling means attached to said second joint means, said first coupling means connecting conduits of a first plurality to respective of said internal passages at said flat surface of said second joint means body portion; and second coupling means for connecting conduits of a second Plurality to respective of said internal passages at said flat surface of said first joint means whereby fluid communication is established between individual conduits of said first and second pluralites through said joint means.

28. An articulated arm for providing a multi-path fluid connection between a fixed pivot and a movable pivot, the articulated arm including a plurality of separate conduits for transporting the fluid between the fixed pivot and the movable pivot, the articulated arm being provided with at least one bend pivot between the fixed pivot and the movable pivot, the pivot each comprising:

first joint means, said first joint means including a body portion having a cylindrical bore, said first joint means having a plurality of spacially separated annular grooves formed in the wall of said bore, said first joint means further having a plurality of internal passages, said passages establishing fluid communication between said annular grooves and the exterior of said first joint means;

second joint means, said second joint means having a body portion and a cylindrical extension, said extension being sized to be rotatably fitted within said bore of said first joint means, said second joint means being provided with internal passages extending between the exterior of said body portion and the exterior of said extension, the terminations of the passages at the exterior of said extension being in registration with said annular grooves of said first joint means;

third joint means affixed to said drill, said third joint means having a bore therethrough, said bore of said third joint means having a plurality of spacially separated annular grooves therealong;

said first joint means of said movable pivot being provided with a cylindrical extension, said extension being rotatably fitted within said bore of said bore of said third joint, said first joint means extension being provided with internal passages communicating with said internal passages of said first joint means body portion, said third joint means also being provided with internal passages which extend between said grooves of the bore therein and a surface of said third joint means whereby said third joint means passages are in communication with said annular grooves of said first joint means bore;

sealing means, said sealing means fluidically sealing and second joint menas within said bore of said first joint means while allowing rotation between said joint means, said sealing means preventing leakage of fluid between adjacent of said first joint means grooves;

a drill for tap holes of a shaft furnace;

a support bar, said drill being movable along said support bar; and wherein said articulated arm supplies pressurized fluid to said drill.

29. The device of claim 28 wherein said separate conduits are provided with bends.

30. The device of claim 29 wherein said arm has at least five pivot axes.

31. The device of claim 28 wherein said arm has at least five pivot axes.

* * * * *

UNITED STATES PATENT AND TRADEMARK OFFICE
CERTIFICATE OF CORRECTION

PATENT NO. : 4,497,379
DATED : February 5, 1985
INVENTOR(S) : Pierre Mailliet; Edgar Kraemer It is certified that error appears in the above-identified patent and that said Letters Patent are hereby corrected as shown below:

Col. 1, line 10, after "tool" insert --.--

Col. 11, line 32, "extendion" should be --extension--.
Col. 11, line 41, "pssages" should be --passages--.
Col. 11, line 43, after "extension" cancel --, the--.
Col. 11, line 44, delete "terminations of".
Col. 11, line 45, delete "the passages at the exterior of said extension,".
Col. 12, line 32, "passges" should be --passages--.
Col. 12, line 60, "specially" should be --spacially--.
Col. 13, line 12, the following was omitted, please add:
   --sealing means, said sealing means fluidically sealing said second joint means within said bore of said first joint means while allowing rotation between said joint means, said sealing means preventing leakage of fluid between adjacent of said first joint means grooves.--
Col. 13, line 36, "passage" should be --passages--.
Col. 13, line 39, after "plurality" "of" should be --to--.
Col. 16, line 20, cancel "bore of said".

Signed and Sealed this

Tenth Day of June 1986

[SEAL]

Attest:

DONALD J. QUIGG

Attesting Officer    Commissioner of Patents and Trademarks